US010262041B2

(12) United States Patent
McCoy et al.

(10) Patent No.: US 10,262,041 B2
(45) Date of Patent: Apr. 16, 2019

(54) SCORING MECHANISM FOR DISCOVERY OF EXTREMIST CONTENT

(71) Applicant: Accenture Global Solutions Limited, Dublin (IE)

(72) Inventors: Anthony McCoy, Dublin (IE); Md Faisal Zaman, Dublin (IE); Carl Sharpe, Dublin (IE); Sofian Hamiti, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/473,173

(22) Filed: Mar. 29, 2017

(65) Prior Publication Data

US 2018/0285362 A1  Oct. 4, 2018

(51) Int. Cl.
*G06F 17/30* (2006.01)
*G06Q 50/26* (2012.01)

(52) U.S. Cl.
CPC .... *G06F 17/3053* (2013.01); *G06F 17/30241* (2013.01); *G06F 17/30247* (2013.01); *G06F 17/30634* (2013.01); *G06Q 50/265* (2013.01)

(58) Field of Classification Search
None
See application file for complete search history.

(56) References Cited

U.S. PATENT DOCUMENTS

| 7,908,658 | B1 * | 3/2011 | Oeij | H04L 63/1425 709/206 |
| 8,819,816 | B2 * | 8/2014 | Stein | G06F 15/16 726/22 |
| 9,075,812 | B1 * | 7/2015 | Heyward | G06F 17/30112 |
| 9,286,326 | B1 * | 3/2016 | Heyward | G06F 17/30253 |
| 9,356,920 | B2 * | 5/2016 | Stein | G06F 15/16 |
| 2011/0289098 | A1 * | 11/2011 | Oztaskent | G06F 17/30026 707/769 |

(Continued)

FOREIGN PATENT DOCUMENTS

CN   102170640 A   8/2011

OTHER PUBLICATIONS

Co-pending U.S. Appl. No. 15/365,362 entitled "Automatic Prediction of an Event Using Data", by Dominique Verdejo et al., filed Nov. 30, 2017, 59 pages.
Co-pending U.S. Appl. No. 15/424,199 entitled "User Classification Based on Multimodal Information", by Freddy Lecue et al., filed Feb. 3, 2017, 53 pages.

(Continued)

*Primary Examiner* — Hung D Le
(74) *Attorney, Agent, or Firm* — Harrity & Harrity, LLP

(57) ABSTRACT

A device may receive a plurality of data objects from a plurality of sources; identify text data, image data, and location data of the plurality of data objects; identify relevant data objects, of the plurality of data objects, based on the text data, and/or based on the image data, based on the location data, and/or based on comparing the text data, the image data, and the location data to a predefined element that identifies values relevant to a particular group or subject area; assign scores to the relevant data objects based on the text data, the image data, and the location data; aggregate the scores, as one or more aggregated scores, with regard to one or more users associated with the relevant data objects; and/or perform one or more actions based on the one or more aggregated scores associated with the one or more users.

20 Claims, 9 Drawing Sheets

(56) References Cited

U.S. PATENT DOCUMENTS

| | | | |
|---|---|---|---|
| 2012/0124664 A1* | 5/2012 | Stein | G06F 15/16 726/22 |
| 2014/0201178 A1* | 7/2014 | Baecke | G06F 17/30038 707/706 |
| 2014/0331283 A1* | 11/2014 | Stein | G06F 15/16 726/3 |
| 2014/0337972 A1 | 11/2014 | Foster et al. | |
| 2015/0052074 A1 | 2/2015 | Reynolds et al. | |
| 2015/0254230 A1* | 9/2015 | Papadopoullos | G06F 17/275 704/8 |
| 2015/0347593 A1* | 12/2015 | Tsai | G06F 17/30867 707/722 |
| 2016/0259790 A1* | 9/2016 | Mashiach | G06F 17/30867 |
| 2016/0314113 A1* | 10/2016 | Moharrami | G06F 17/2785 |
| 2016/0379326 A1 | 12/2016 | Chan-Gove et al. | |
| 2017/0034112 A1* | 2/2017 | Perlegos | H04L 51/32 |
| 2017/0063873 A1* | 3/2017 | Hidden | H04L 63/105 |
| 2017/0091888 A1* | 3/2017 | Fredinburg | G06Q 50/265 |
| 2017/0147696 A1* | 5/2017 | Evnine | G06F 17/30867 |
| 2017/0264578 A1* | 9/2017 | Allen | H04L 51/10 |
| 2017/0289589 A1* | 10/2017 | Koumchatzky | G06N 3/0454 |
| 2017/0323018 A1* | 11/2017 | Angelova | G06F 17/30867 |

OTHER PUBLICATIONS

Spyrou Evaggelos et al: "Analyzing Flickr 1-15 metadata to extract location-based information and semantically organize its photo content", Neurocomputing, vol. 172, Jan. 8, 2016.

Extended European Search Report corresponding to EP 18162496, dated Jun. 29, 2018, 8 pages.

* cited by examiner

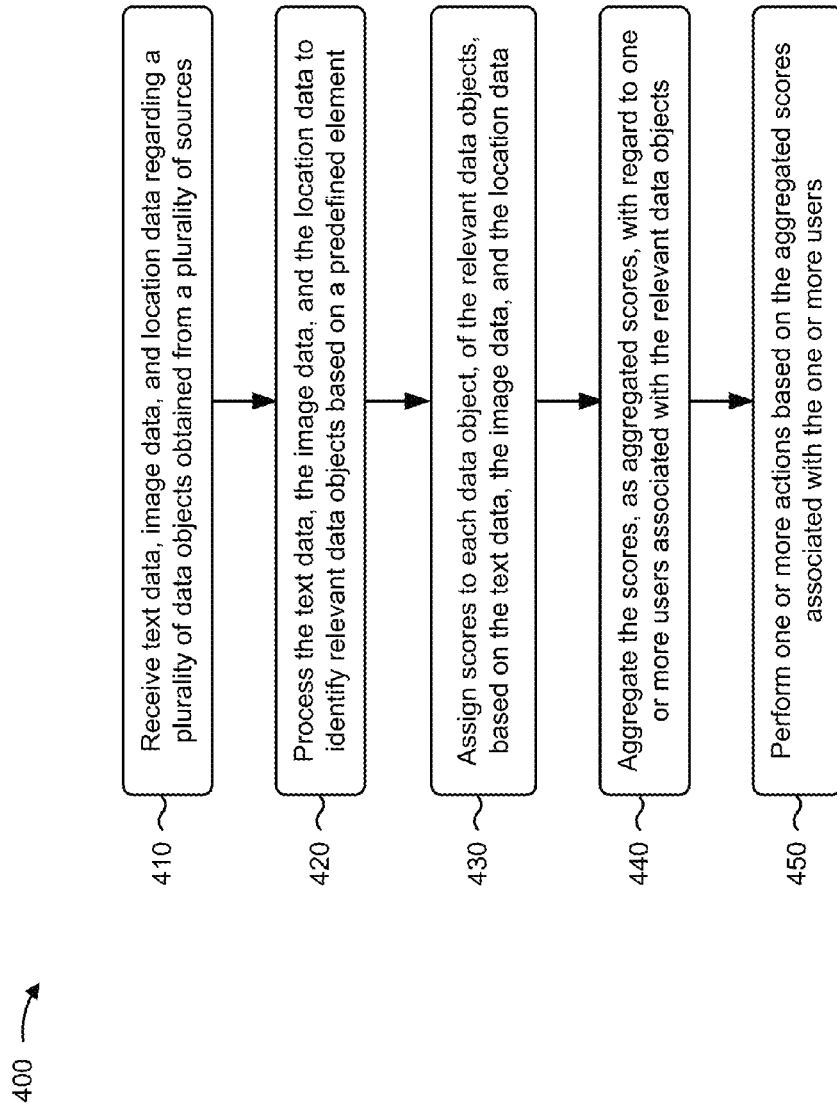

SCORING MECHANISM FOR DISCOVERY OF EXTREMIST CONTENT

BACKGROUND

Social media platforms publish content that is created or curated by users of the social media platform. A publication of content may be referred to as a post. Social media posts may include textual information, audio information, video information, and/or the like. Social media posts may also be associated with metadata that can be used to determine information regarding a user that provided the content, such as location, time, user preferences, device information, and/or the like.

SUMMARY

A method may include receiving, by one or more devices of a cloud computing environment, a plurality of data objects from a plurality of sources; identifying, by the one or more devices, text data, image data, and location data of the plurality of data objects; identifying, by the one or more devices, relevant data objects, of the plurality of data objects, based on the text data, and/or based on the image data, and/or based on the location data, the relevant data objects being identified based on comparing the text data, the image data, and the location data to a predefined element that identifies values relevant to a particular group or subject area; assigning, by the one or more devices, scores to the relevant data objects based on the text data, the image data, and the location data; aggregating, by the one or more devices, the scores, as one or more aggregated scores, with regard to one or more users associated with the relevant data objects; and/or performing, by the one or more devices, one or more actions based on the one or more aggregated scores associated with the one or more users.

A device may include one or more processors to receive a plurality of data objects from a plurality of sources; identify text data, image data, and location data of the plurality of data objects; identify relevant data objects, of the plurality of data objects, based on the text data, and/or based on the image data, and/or based on the location data, the relevant data objects being identified based on comparing the text data, the image data, and the location data to a predefined element that identifies values relevant to a particular group or subject area; assign scores to the relevant data objects based on the text data, the image data, and the location data; aggregate the scores, as one or more aggregated scores, with regard to one or more users associated with the relevant data objects; and/or perform one or more actions based on the one or more aggregated scores associated with the one or more users.

A non-transitory computer-readable medium storing instructions, the instructions comprising one or more instructions that, when executed by one or more processors, cause the one or more processors to identify text data, image data, and location data of a plurality of data objects associated with a plurality of social media posts and associated with a plurality of sources; identify relevant data objects, of the plurality of data objects, based on the text data, the image data, and the location data, the relevant data objects being identified based on comparing the text data, the image data, and the location data to a predefined element that identifies values relevant to a particular group or subject area; assign scores to the relevant data objects based on the text data, the image data, and the location data; aggregate the scores, as an aggregated score, with regard to a user associated with the relevant data objects; and/or perform an action based on the aggregated score associated with the user.

BRIEF DESCRIPTION OF THE DRAWINGS

FIG. 4 is a flow chart of an example process for determining aggregated scores of data objects for users of a social media platform.

DETAILED DESCRIPTION

Figure 1A:
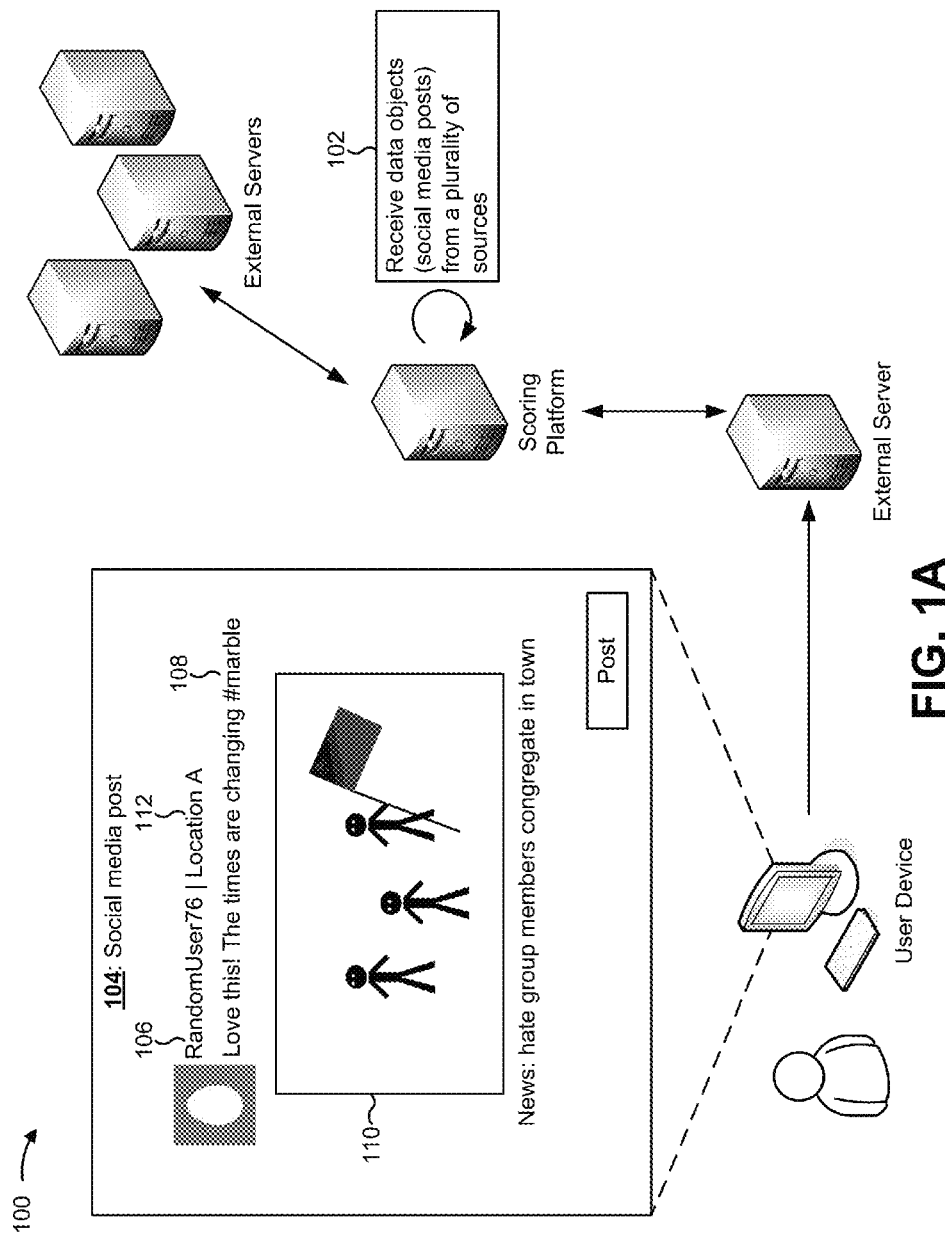
FIGS. 1A-1F are diagrams of an overview of an example implementation described herein.

The following detailed description of example implementations refers to the accompanying drawings. The same reference numbers in different drawings may identify the same or similar elements.

A social media platform may provide ways for users to interact with each other in a publicly accessible fashion. For example, a user may create social media content, such as a post or a publication, that includes information that is interesting or relevant to the user. In some cases, the post or publication may be published in a fashion that is accessible to anyone with access to the social media platform. Also, the post or publication may be associated with metadata describing the user and/or the post or publication. Some social media platforms may provide an interface, such as an application programming interface and/or the like, via which a device may download the social media content and the metadata. Further, the application programming interface may provide tools for obtaining additional information relating to the social media content, such as information regarding popularity of the social media content, interactions by other users with the social media content, and/or the like.

Social media may be a valuable way to identify trends, groups, and/or the like. For example, by analyzing interactions with content associated with a particular subject area, an entity may identify users that are interested in the particular subject area. As another example, by identifying a group of users associated with a particular subject area, the entity may identify other users that may be interested in the particular subject area based on interactions of the other users with the group of users. As a third example, a co-occurrence of social media posts associated with a particular location and relating to a particular subject area may indicate that a gathering of users associated with the subject area is occurring at the particular location. Such analysis may be useful, as an example, for identifying extremist groups, users that are vulnerable to extremist ideologies, an individual or group that poses a threat to public safety, and/or the like.

However, it may be difficult and inefficient for a person to identify connections between trends, groups, social media posts, and users. For example, the person may be biased toward particular data types (e.g., may prefer to evaluate social media posts based on text information, rather than image information), and may not use a sufficiently comprehensive approach to identify such connections (e.g., may not evaluate metadata, location information, or other relevant information). A device attempting to identify such connections may encounter similar issues. For example, the device may rely on rigid approaches to identify connections, such as a keyword search, manual interpretation of potentially related entities, and/or the like. Further, the person or the device may not have a complete understanding of tendencies of the users associated with the trends or groups. For example, the person or device may not know certain code language, tendencies, locations, and/or the like, that are used by the users. Thus, the person or device may not detect certain connections.

Implementations described herein assign scores to data objects (e.g., collections of information corresponding to social media content) based on text data, image data, and location data read from the data objects. Implementations described herein may assign such scores based on a predefined element relating to a particular group or subject area, such as an ontology relating to extremist groups, behaviors, or ideologies. Some implementations described herein may determine the text data, image data, and/or location data based on natural language processing, image detection, computer vision, contextual analysis, and/or the like, which improves versatility of the detection process and improves accuracy of the results without requiring human intervention. When implementations described herein detect a recurring text, image, or location value that is not identified by the predefined element, implementations described herein may automatically add the recurring value to the predefined element, which improves accuracy of the predefined element and allows implementations described herein to adjust over time as tendencies of social media users change. In this way, implementations described herein may perform pattern of life discovery, network analysis, and/or the like.

While implementations described herein are primarily described in the context of collecting and analyzing information from social media platforms, implementations described herein are not limited to collection of such information from social media platforms. For example, the information may be provided by another entity or agency, such as a law enforcement agency, a governmental entity, an individual, a crowdsourced data gathering operation, and/or the like. Furthermore, the information collected by implementations described herein need not be associated with a social media network. For example, implementations described herein can be applied for a private network, a group of users associated with a company, or any other similar body of information. Furthermore, while implementations described herein are primarily described in the context of identifying extremist groups, implementations described herein can be used to identify any person or group of interest.

FIGS. 1A-1F are diagrams of an overview of an example implementation 100 described herein. As shown in FIG. 1A, and by reference number 102, a scoring platform may receive data objects from a plurality of sources. As further shown, the data objects may correspond to social media posts. For example, the data objects may include files that are generated based on social media posts and provided to the scoring platform via an application programming interface of a social media platform. As further shown, the data objects may be received from external servers. For example, the external servers may be associated with one or more social media platforms to which the social media posts are posted.

As shown by reference number 104, the data objects may correspond to social media posts. As shown by reference number 106, the social media posts may be associated with information identifying a user (e.g., a username and/or the like). As shown by reference number 108, in some cases, the social media posts may be associated with text data (e.g., "Love this! The times are changing #marble"). As shown by reference number 110, in some cases, the social media posts may be associated with an image. The scoring platform may determine image data based on the image, as described in more detail below. As shown by reference number 112, in some cases, the social media posts may be associated with location data. Here, the location data is specified as part of the social media post (e.g., Location A). In some cases, and as described below, the scoring platform may determine the location data based on other information included in or associated with the social media post (e.g., image data, text data, locations of other posts, and/or the like). Additionally, or alternatively, the social media posts may include other information, such as audio information, video information, and/or the like.

Figure 1B:
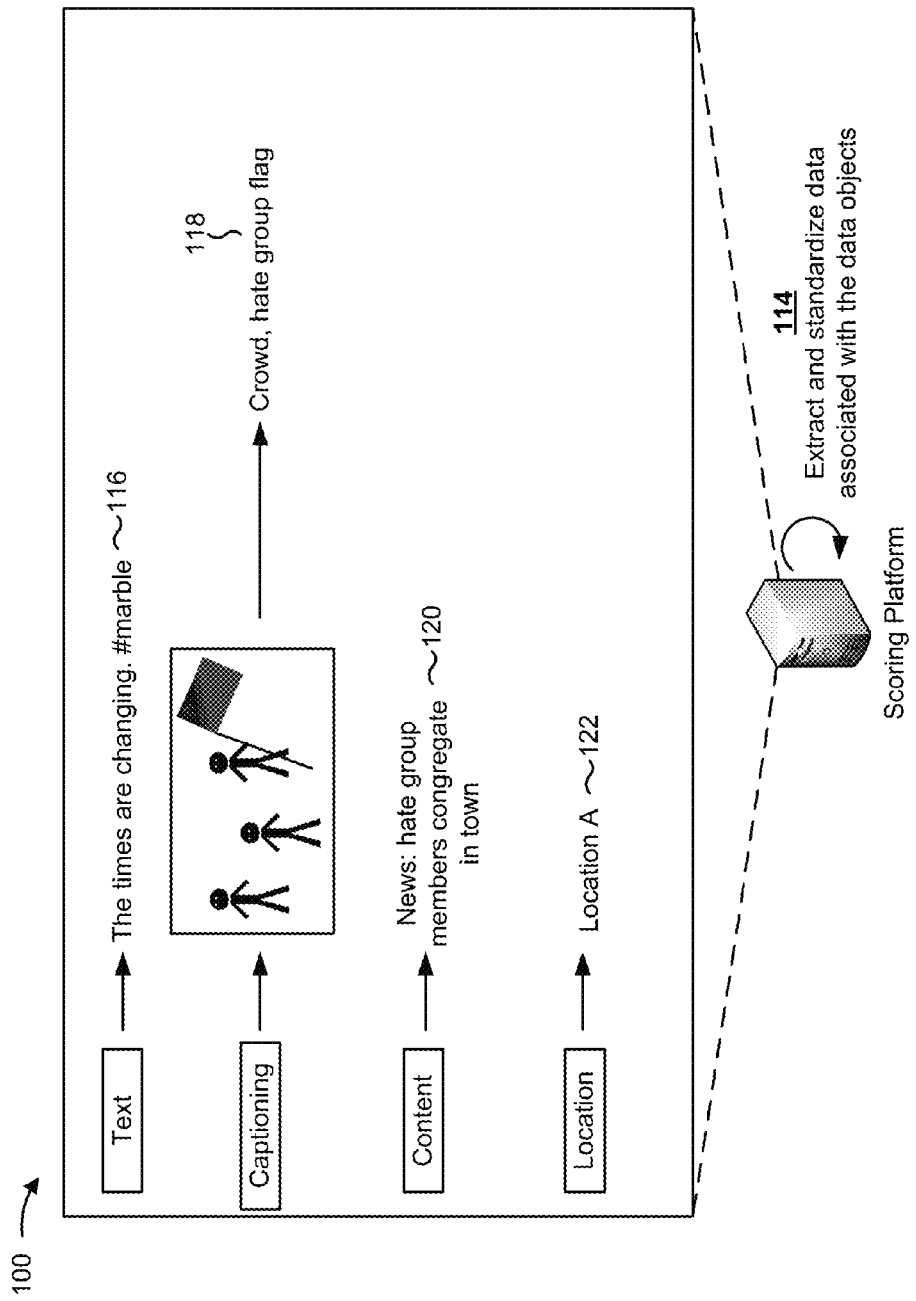

As shown in FIG. 1B, and by reference number 114, the scoring platform may receive and standardize data (e.g., text data, image data, location data, content, and/or the like) associated with the data objects. For example, as shown by reference number 116, the scoring platform may identify text data of "The times are changing. #marble." As shown by reference number 118, the scoring platform may identify image data based on an image captioning process. The image captioning process may determine a textual description of an image associated with a data object. For example, in FIG. 1B, the image captioning process identifies values of "crowd" and "hate group flag" for the image associated with the social media post. In some implementations, the image captioning process may be performed using computer vision and/or user input (e.g., crowdsourced input, gamified input, etc.). In some implementations, the scoring platform may identify contextual information of the image based on the image captioning process. For example, in FIG. 1B, the contextual information may indicate "man holding a hate group flag" as well as the objects present in the image. In some implementations, the image captioning process may generate a textual output based on the image information, which may enable various natural language processing operations to be performed on the image information.

Notably, by performing the image captioning process, the scoring platform reduces an effect of language barriers on the identification of persons of interest. For example, language barriers may provide a significant challenge for detection of persons of interest. By identifying persons of interest using location information, audio information, image information, video information, and/or the like, implementations described herein reduce the effect of the language barrier.

As shown by reference number 120, the scoring platform may identify content associated with the social media post. Here, the content includes a news article entitled "hate group members congregate in town." As shown by reference number 122, the scoring platform may identify location data associated with the social media post. Here, the scoring platform identifies a location of Location A. The scoring platform may identify the location data based on information included in the social media post, information provided by a user device that generated the social media post, and/or the like.

Figure 1C:
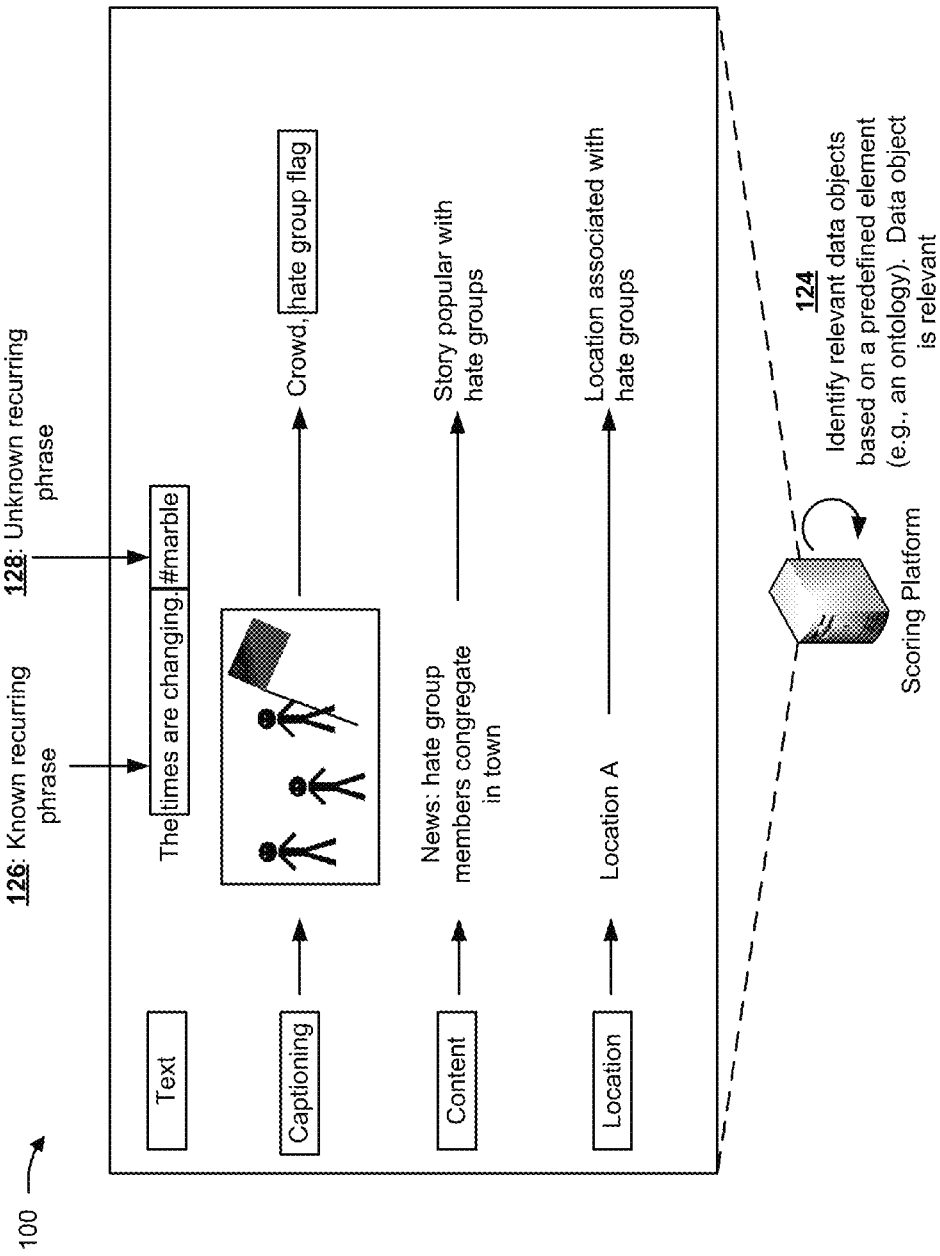

As shown in FIG. 1C, and by reference number 124, the scoring platform may identify relevant data objects, of a plurality of data objects received by the scoring platform, based on a predefined element. Here, the predefined element includes an ontology. An ontology may identify values (e.g., values of text data, image data, location data, content, metadata, user identifiers, and/or the like) that are relevant to a particular group, subject area, and/or the like.

As shown by reference number 126, in some cases, the scoring platform may identify text data as a known recurring phrase. A known recurring phrase may be identified by the predefined element as associated with a particular group, subject area, and/or the like. The scoring platform may identify the data object as a relevant data object based, at least in part, on the known recurring phrase being included in the data object.

As shown by reference number 128, in some cases, the scoring platform may identify text data as an unknown recurring phrase. An unknown recurring phrase may not be identified by the predefined element. For example, the scoring platform may determine that the unknown recurring phrase occurs in multiple data objects that are identified as relevant data objects, and may identify the unknown recurring phrase accordingly. In some implementations, the scoring platform may add the unknown recurring phrase to the predefined element, as described in more detail elsewhere herein.

As further shown, the scoring platform identifies other data based on the predefined element, and identifies the data object as a relevant data object accordingly. Here, the scoring platform identifies part of the image data (e.g., the value of "hate group flag") as relevant, identifies the news content as relevant, and identifies the location as relevant. For example, the scoring platform may compare these values to values identified in the predefined element (e.g., based on natural language processing, fuzzy matching, text processing, artificial intelligence, and/or the like) to determine that the data object is relevant.

Figure 1D:
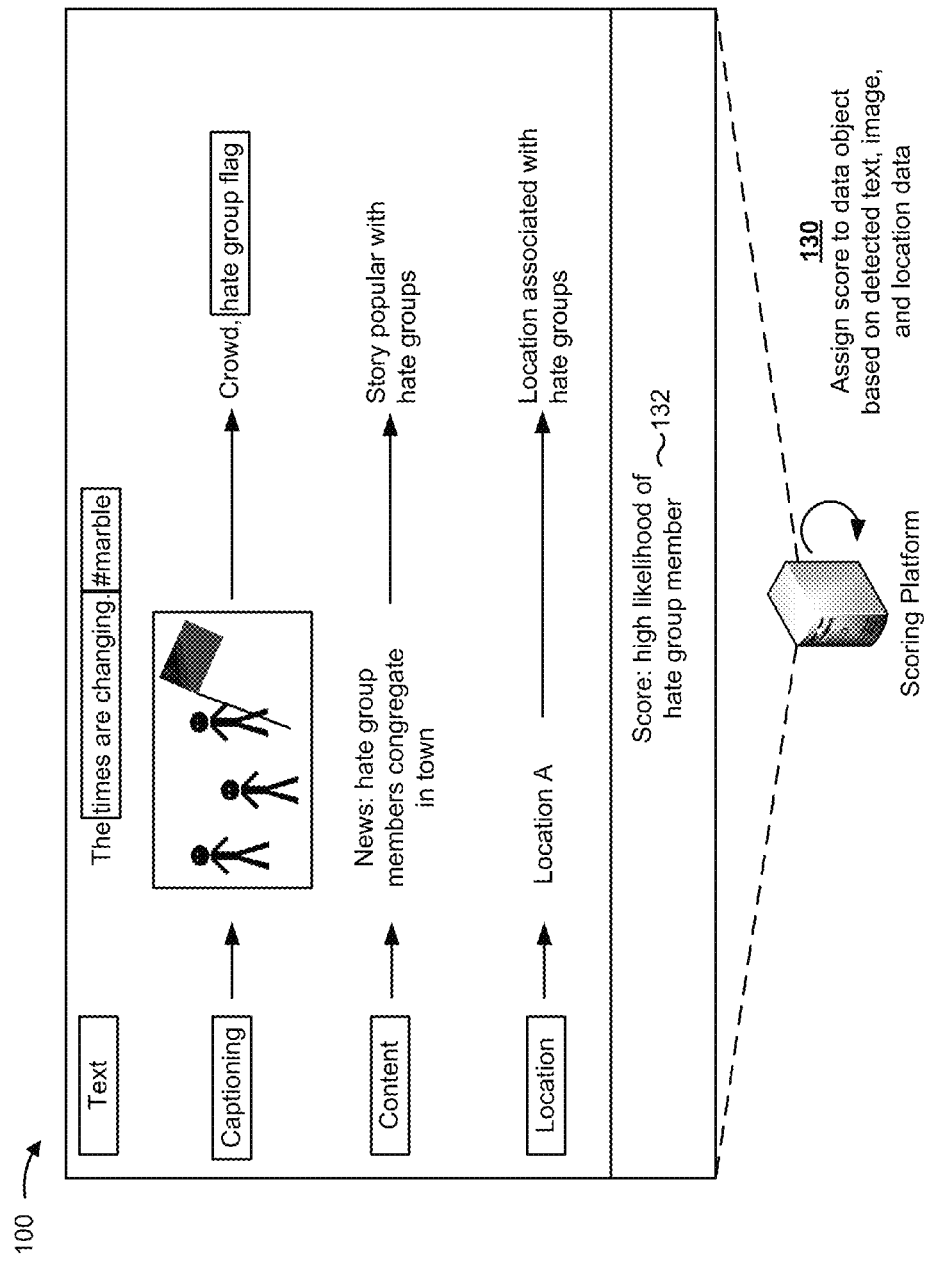

As shown in FIG. 1D, and by reference number 130, the scoring platform may assign a score to the data object based on the received text data, image data, and location data. In some implementations, the scoring platform may assign the score based on other information, such as the news content, metadata, an identity of a user associated with the data object, an age of the data object, and/or the like. The scoring platform may determine the score based on the predefined element, and based on an artificial intelligence approach, a machine learning approach, a fuzzy matching approach, and/or the like, as described in more detail below. In some cases, the scoring platform may determine several scores based on different aspects of the data object (e.g., the text data, the image data, the location data, the news content, metadata, an identity of the user, an age of the data content, etc.), and may combine the several scores to determine a score of the data object. As shown by reference number 132, the scoring platform may determine a score indicating that a user that posted the social media post has a high likelihood of being a hate group member.

Figure 1E:
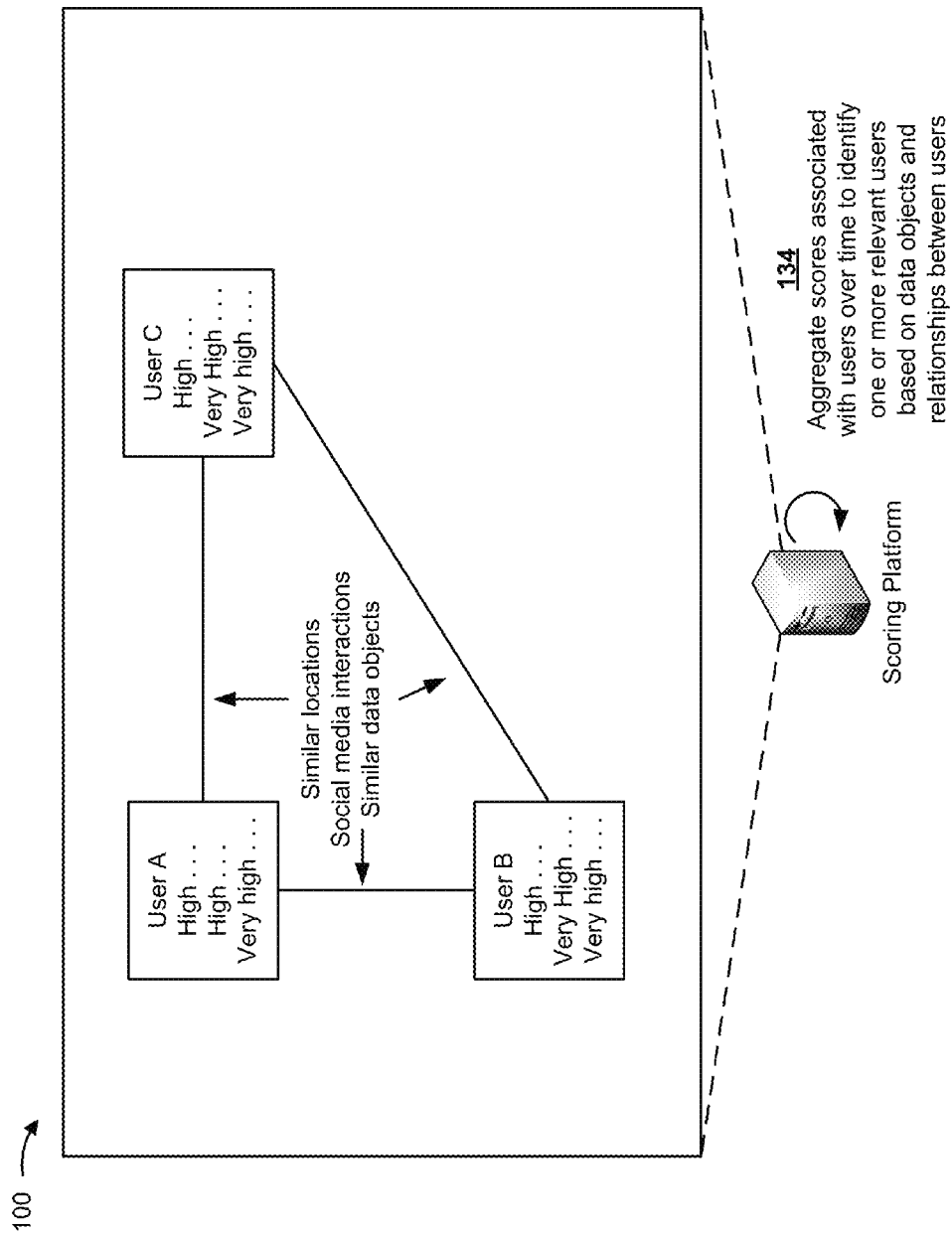

As shown in FIG. 1E, and by reference number 134, the scoring platform may aggregate scores associated with users (e.g., the user that posted the example shown in FIGS. 1A-1D and/or other users). As further shown, the scoring platform may aggregate the scores to identify one or more relevant users (e.g., relevant to a group or subject area associated with the predefined element) based on the data objects associated with the one or more relevant users and/or relationships between the users. For example, and as shown, the scoring platform may store scores associated with users (e.g., User A, User B, and User C), and may identify relationships between the users. The relationships may be based on similar locations of the users, similar data objects associated with social media posts by the users, social media interactions between the users, and/or the like.

Figure 1F:
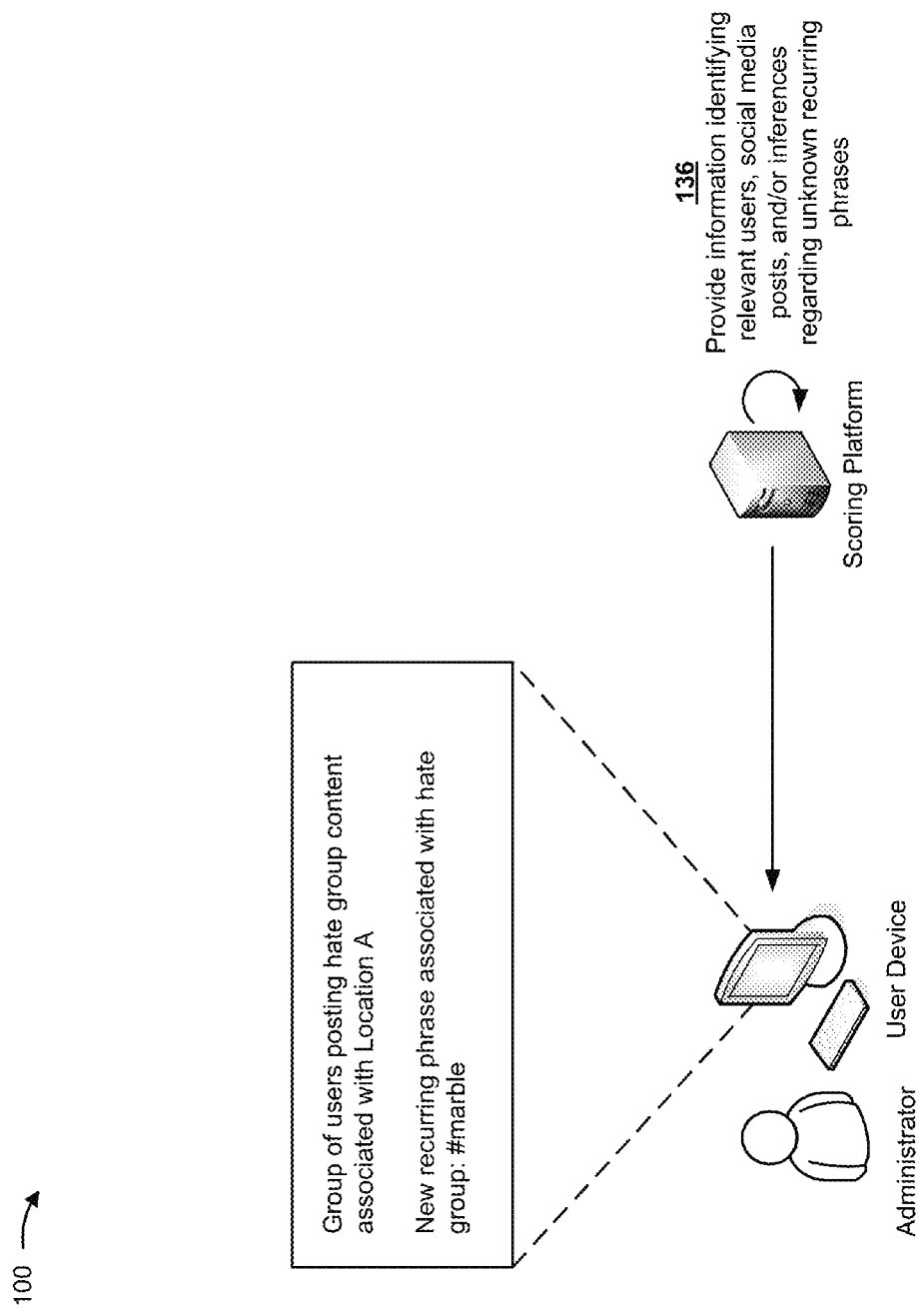

As shown in FIG. 1F, and by reference number 136, the scoring platform may provide information identifying information regarding the relevant users and/or the social media posts. For example, and as shown, the scoring platform may provide information indicating that a group of users are posting hate group content associated with Location A (e.g., the location identified by the social media post). By identifying the group of users based on text data, image data, and location data, and by using the predefined element, the scoring platform improves accuracy and reduces subjectivity of identification of such users (e.g., by human observers, or by a computer system using a more rigid approach or an approach using a single mode of information).

As further shown, the scoring platform may provide information identifying the unknown recurring phrase (e.g., #marble). For example, the scoring platform may identify the unknown recurring phrase, and may provide information identifying the unknown recurring phrase to an administrator. Thus, the administrator is made aware of the unknown recurring phrase, which may have previously escaped human detection. In some cases, the scoring platform may add the unknown recurring phrase to the predefined element (e.g., based on an indication from the administrator or automatically).

In this way, the scoring platform identifies and scores data objects (e.g., social media posts) that are associated with a particular group or subject area based on a predefined element (e.g., an ontology) identifying values relating to the particular group or subject area. The scoring platform generates the scores based on a multimodal approach of evaluating text data, image data, and location data of the data objects. Further, the scoring platform may identify users associated with the data objects, may identify relationships between the users and/or other users based on the data objects and/or connections between the users and/or other users, and may perform actions based on information identifying the scores and/or users. In this way, the scoring platform may conserve organizational resources that would otherwise be used to identify users and/or data objects, applies a rigorous standardized approach to a process that was previously performed based on human intuition (e.g., identification of data objects and users that are relevant to a predefined element), and may iteratively improve the predefined element over time to improve automatic processing of data objects.

As indicated above, FIGS. 1A-1F are provided merely as an example. Other examples are possible and may differ from what was described with regard to FIGS. 1A-1F.

Figure 2:
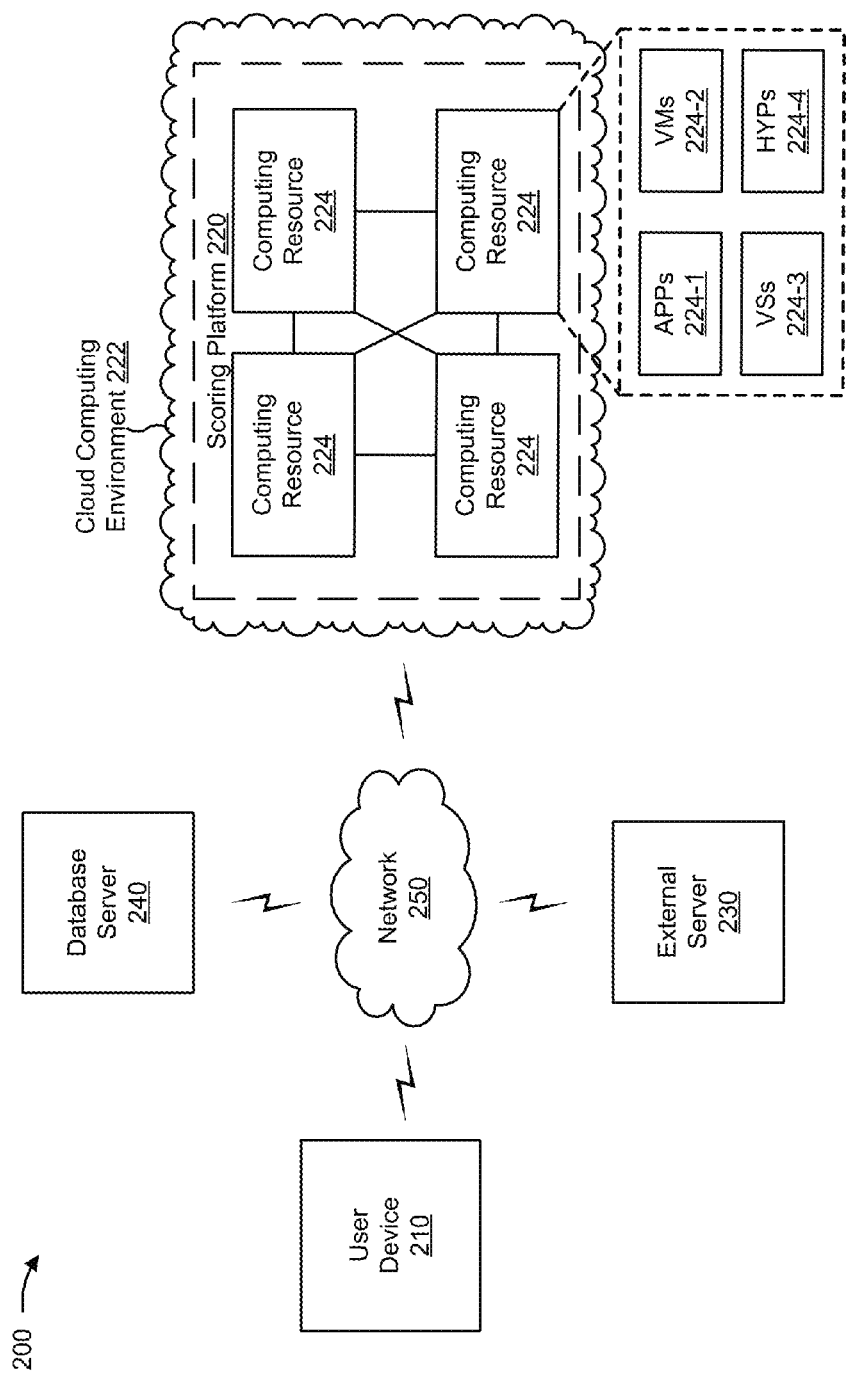
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, scoring platform 220 hosted within a cloud computing environment 222, computing resource 224, external server 230, database server 240, and network 250. Devices of environment 200 may interconnect via wired connections, wireless connections, or a combination of wired and wireless connections.

User device 210 includes one or more devices capable of receiving, generating, storing, processing, and/or providing information associated with social media content. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Scoring platform 220 includes one or more devices capable of obtaining data objects associated with social media content, standardizing and receiving data of the data objects, determining scores based on the data, and/or determining and providing information based on the scores. For example, scoring platform 220 may include a server, a group of servers, or a similar device. In some implementations, scoring platform 220 may be designed to be modular such that certain software components can be swapped in or out depending on a particular need. As such, scoring platform 220 may be easily and/or quickly reconfigured for different uses.

In some implementations, as shown, scoring platform 220 may be hosted in cloud computing environment 222. Notably, while implementations described herein describe scoring platform 220 as being hosted in cloud computing environment 222, in some implementations, scoring platform 220 may not be cloud-based (i.e., may be implemented outside of a cloud computing environment) or may be partially cloud-based.

Cloud computing environment 222 includes an environment that delivers computing as a service, whereby shared resources, services, etc. may be provided to scoring platform 220. Cloud computing environment 222 may provide computation, software, data access, storage, and/or other services that do not require end-user knowledge of a physical location and configuration of a system and/or a device that delivers the services. As shown, cloud computing environment 222 may include scoring platform 220, which may be comprised of a set of computing resources 224.

Computing resource 224 includes one or more personal computers, workstation computers, server devices, or another type of computation and/or communication device. In some implementations, computing resource 224 may host scoring platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 may include a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with scoring platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210, and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 provides hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

External server 230 includes one or more devices, accessible through network 250, that are sources of information that may be used by scoring platform 220. For example, external server 230 may include a server that includes particular information for use by scoring platform 220 and/or user device 210. For example, external server 230 may include a server or a group of servers (e.g., a cloud-based server, an application device, a content server, a host server, a web server, a database server, a data center server, etc.), a desktop computer, or a similar device. In some implementations, a set of external servers 230 may be associated with one or more social media platforms.

Database server 240 includes one or more devices capable of receiving, storing, and/or providing information for use by scoring platform 220. For example, database server 240 may include a server or a group of servers. In some implementations, database server 240 may provide, to scoring platform 220, information and/or resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
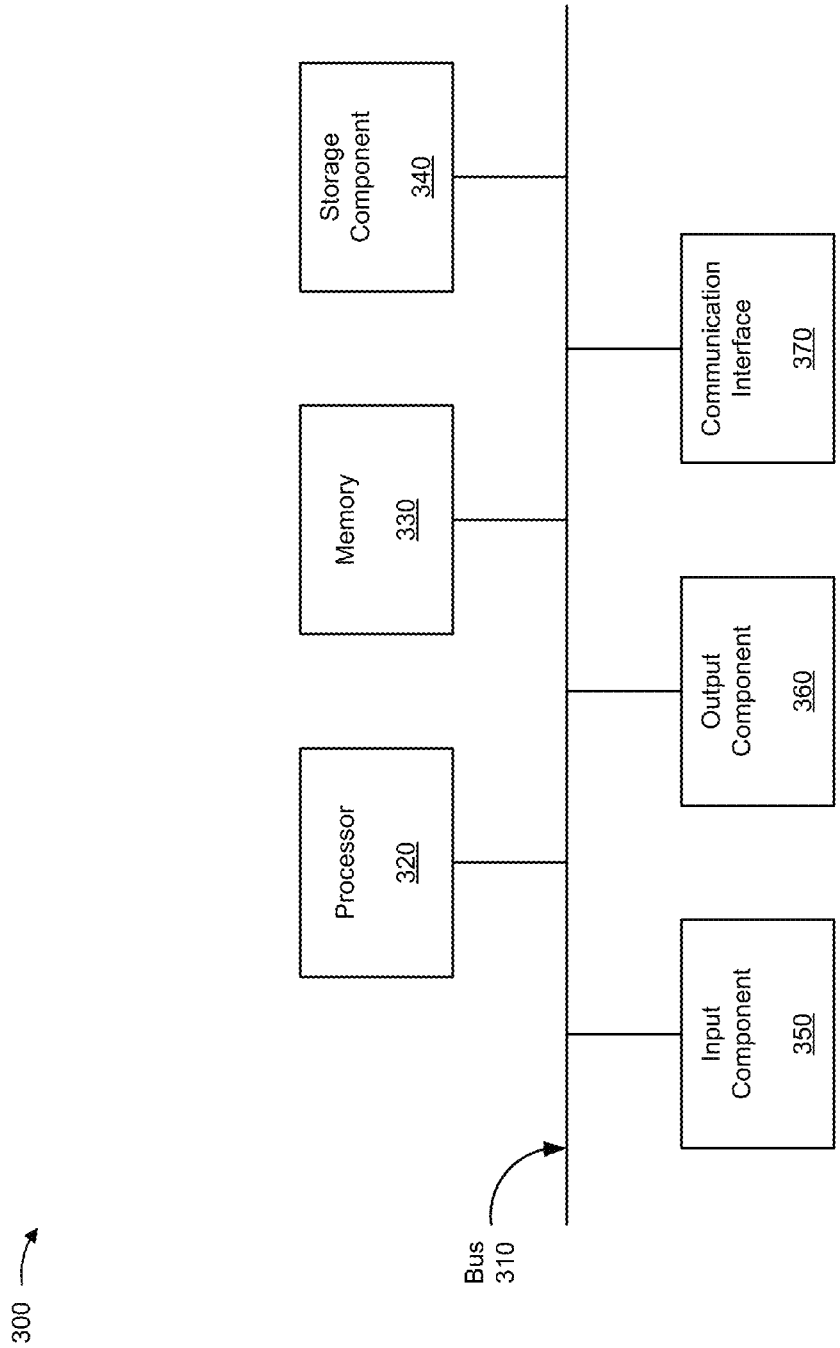
FIG. 3 is a diagram of example components of one or more devices of FIG. 2.

FIG. 3 is a diagram of example components of a device 300. Device 300 may correspond to user device 210, scoring platform 220, computing resource 224, external server 230, and/or database server 240. In some implementations, user device 210, scoring platform 220, computing resource 224, external server 230, and/or database server 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for determining aggregated scores of data objects for users of a social media platform. In some implementations, one or more process blocks of FIG. 4 may be performed by scoring platform 220. In some implementations, one or more process blocks of FIG. 4 may be performed by another device or a group of devices separate from or including scoring platform 220, such as user device 210, external server 230, or database server 240.

As shown in FIG. 4, process 400 may include receiving text data, image data, and location data regarding a plurality of data objects obtained from a plurality of sources (block 410). For example, scoring platform 220 may receive, from a plurality of sources, data objects. In some implementations, the data objects may include or relate to social media content, such as social media posts. For example, the data objects may include text data, image data, video data, metadata, and/or information relating to users associated with the social media content, as described in more detail below. In some implementations, the data objects may include comments on a news site, comments on a forum, or any other type of user-generated content. In some implementations, and as described elsewhere herein, scoring platform 220 may determine information regarding the users based on receiving information from the data objects and aggregating scores for the users based on the data objects.

In some implementations, a data object may include user generated content such as a document, a webpage, a weblog post, a social media account post, an email, an image file, an audio file, a video file, or the like. Additionally, or alternatively, a data object may include a resource identifier (e.g., a uniform resource identifier (URI), a uniform resource locator (URL), a uniform resource name (URN), a network address, a database address, or the like).

Additionally, or alternatively, a data object may be associated with a particular file type and/or format (e.g., a hypertext markup language (HTML) file, an extensible markup language (XML) file, a text file, a joint photographic experts group (JPEG) file, a portable network graphics (PNG) file, a motion photographic experts group (MPEG) file, an audio video interleave (AVI) file, a portable document format (PDF) file, or the like). Additionally, or alternatively, a data object may include a resource associated with a particular source (e.g., a user that generated the information, a device that stores the resource, or the like).

As a particular example, a data object may include a file, outputted by an application programming interface of a social media platform, that contains data and metadata of a social media post. For example, the data object may identify content of the post, metadata regarding the post, a user that created the post, interactions with the post (e.g., likes, reactions, shares, reblogs, screenshots, saves, etc.), and/or the like.

In some implementations, scoring platform 220 may receive information associated with a user account (e.g., a user account associated with a service, such as a social media platform, a networking service, an email service, etc., and/or another type of user account associated with posts that include text information, audio information, video information, image information, or the like). For example, a user may generate posts, in association with a user account, that include information associated with various data types and/or data formats. In some implementations, scoring platform 220 may receive information associated with a large number of user accounts associated with users that are to be classified (e.g., millions, billions, trillions, etc. of items of information associated with hundreds, thousands, millions, etc. of user accounts).

In some implementations, scoring platform 220 may receive, from user device 210, the data objects and/or a memory location at which the data objects are stored. Additionally, or alternatively, scoring platform 220 may perform a technique (e.g., a web crawling technique, a web scraping technique, a data mining technique, a web searching technique, a database searching technique, or the like), and receive data objects to be processed based on the technique. As an example, scoring platform 220 may receive information that identifies a resource identifier, and obtain information to be processed based on the resource identifier (e.g., may access a resource using the resource identifier, may request a resource using the resource identifier, or the like). As another example, scoring platform 220 may receive information that identifies a data object (e.g., a social media post) and may obtain information regarding users associated with the data object (e.g., a user that posted the social media post, users that are associated with the user that posted the social media post, users that have interacted with the social media post, and/or the like).

In some implementations, a data object may be associated with location data. For example, the location data may include one or more location indicators, such as information that identifies a geographic location associated with a computing device that generated the information, a geographic location that is assigned to the data object, or the like. In some implementations, the location data may be provided by a user that generated a post corresponding to the data object. Additionally, or alternatively, the location data may be determined automatically by external server 230 (e.g., external server 230 that stores information regarding the object) and/or user device 210 (e.g., user device 210 that receives user input regarding the data object). In some implementations, the location data may be determined based on other data associated with the data object. For example, if a data object includes image data, the image data may be used to determine (or infer) the location data. In some implementations, image data, associated with multiple images, may be used together to determine (or infer) the location data. Such data objects, that are to be used for inference of location data, may be identified using natural language processing, image processing, image captioning, video captioning, human input, and/or the like.

In some implementations, scoring platform 220 may receive data from the plurality of data objects, such as the text data, the image data, the location data, audio data, video data, and/or the like. Additionally, or alternatively, scoring platform 220 may standardize the received data. For example, scoring platform 220 may standardize the plurality of data objects based on receiving the plurality of data objects and/or based on receiving the data from the plurality of data objects. In some implementations, scoring platform 220 may standardize the data objects and/or the received data to prepare the received data for processing. As an example, scoring platform 220 may standardize information associated with different social media platforms, content types, file types, and/or formats, such that the information is represented in association with a particular file type and/or particular format.

In some implementations, scoring platform 220 may identify a file type and/or format associated with the data object, and determine a technique to standardize the data object based on the file type and/or format. For example, scoring platform 220 may implement a text parsing technique, an object recognition technique, an image processing technique, an image captioning technique, an audio conversion technique, a natural language processing technique, a video captioning technique, or the like, based on a file type and/or format of the data object.

In some implementations, scoring platform 220 may standardize the information such that the information includes a common format of data, such as text. For example, assume that scoring platform 220 receives data objects associated with a user based on a user account (e.g., social media posts). In this case, scoring platform 220 may receive text information, audio information, image information, video information, or the like. As examples, a user may post text information, audio information, video information, etc., in association with the user account. For example, assume that a user posts an image of a flag, such as a flag associated with a particular organization. In this case, and as a particular example, scoring platform 220 may perform an image processing technique, identify objects associated with the image (e.g., the flag), and add terms such as "flag," a name of the organization, and/or the like, to a term corpus (e.g., a corpus of terms received from the data object).

In some implementations, scoring platform 220 may prepare the text for processing by adjusting characters in the text, such as by removing characters, replacing characters, adding characters, adjusting a font, adjusting formatting, adjusting spacing, removing white space, or the like. For example, scoring platform 220 may replace multiple spaces with a single space, insert a space after a left parenthesis, a left brace, a left bracket, etc., and/or insert a space before a right parenthesis, a right brace, a right bracket, etc. In this way, scoring platform 220 may use a space delimiter to more easily parse the text, thereby conserving processor and/or memory resources of scoring platform 220. In some implementations, scoring platform 220 may further prepare the text for processing by expanding acronyms in the text, determining terms in the text (e.g., by determining characters identified by one or more delimiting characters), associating part-of-speech tags (POS tags) with terms in the text, or the like.

As further shown in FIG. 4, process 400 may include processing the text data, image data, and location data to identify relevant data objects based on a predefined element (block 420). For example, scoring platform 220 may filter the text data, image data, and location data based on a predefined element. In some implementations, the predefined element may include information identifying text data, image data, location data, and/or the like. For example, the predefined element may include an ontology relating to a particular subject area. In such a case, scoring platform 220 may identify relevant data objects and assign scores to the relevant data objects, based on the predefined element, as described in more detail below.

In some implementations, the predefined element may include information relating to a particular subject area, such as extremism, crime, a particular political leaning, bullying, and/or the like. For example, the predefined element may include various categories and may identify values corresponding to the categories. When data associated with a data object matches a value of a category, scoring platform 220 may determine that the data object is relevant, and may assign a score to the data object, as described below. Additionally, or alternatively, scoring platform 220 may determine whether a data object is a relevant data object based on a preliminary score that is determined based on the predefined element. For example, scoring platform 220 may determine a quantity of text values, image values, and/or location values of a data object that are identified by the predefined element, and may determine the preliminary score. When the preliminary score satisfies a threshold, scoring platform 220 may determine that the data object is a relevant data object.

As examples, categories and values of a predefined element relating to racism and extremism may include hate words (e.g., hate, don't like, despise, etc.), sentiments (e.g., angry, annoyed, frustrated, etc.), a style score (e.g., that may be determined based on a semantic style of the text data), curse words, topics (e.g., racism, supremacy, historically racist figures, terrorism, famous terrorists, etc.), a lexical diversity score (e.g., that may be determined based on semantic diversity of the text data), symbols (e.g., KKK, liberation army, ISIS flag, curved sword etc.), flags (e.g., nationalist flags, flags associated with a particular organization, etc.), hashtags relevant to particular groups, particular keywords (e.g., heil, 14, 88, jihad, uprising, rebellion, etc.), locations associated with racist, extremist, terrorist, or unlawful groups, and/or the like.

By processing the data objects, using the predefined element, to identify relevant data objects, scoring platform 220 conserves processor and storage resources that would otherwise be used to process irrelevant data objects. Further, by using the ontology to identify data objects that are relevant to a particular subject area, scoring platform 220 may improve efficiency of identifying users that are associated with the particular subject area. This may be useful to law enforcement officials, advertisers, and the like. Still further, by identifying the relevant data objects using content of the data objects (e.g., text data, image data, and location data), scoring platform 220 identifies content relevant to the particular subject area without necessarily receiving human input indicating that the data objects are relevant to the particular subject area. In this way, scoring platform 220 may process volumes of data objects (e.g., millions, billions, trillions, etc. of items of social media content) that are too big for humans to efficiently and objectively process, and may identify relevant data objects based on content of the relevant data objects.

As further shown in FIG. 4, process 400 may include assigning scores to each data object, of the relevant data objects, based on the text data, the image data, and the location data (block 430). For example, scoring platform 220 may assign a score to each data object of the relevant data objects. The score of a data object may be based on data received from the data object and/or data relating to the data object, such as text data, image data, video data, metadata, data regarding users associated with the data object, and/or the like, as described in more detail below. Scoring platform 220 may determine scores for each data object, and may aggregate scores of data objects, with reference to users associated with the data objects, to enable inferences to be made regarding the data objects and/or the users, as described in more detail below.

In some implementations, scoring platform 220 may assign a score based on natural language processing. Natural language processing is a process by which computer-usable information may be received from a textual corpus. For example, natural language processing may identify a meaning or context associated with a textual corpus. In some implementations, scoring platform 220 may use natural language processing to match terms and values of data objects with terms and values of a scoring data set, such as the predefined element. For example, scoring platform 220 may use fuzzy matching, or the like, to determine similarity of textual data and/or image data of the data object to one or more categories or values of the predefined element. In this way, scoring platform 220 determines scores based on natural language that is included in or that describes the data object, which reduces a need for human interaction to assign scores and enables processing of larger volumes of data objects than was previously possible using human analysis and/or less flexible methods of analysis.

In some implementations, scoring platform 220 may assign a score based on a style of a data object. For example, scoring platform 220 may determine a style of text data using a stylometry approach (e.g., based on natural language processing, a neural network, a genetic algorithm, and/or the like). In some implementations, scoring platform 220 may determine a score based on comparing style of a data object to style of a predefined element. For example, scoring platform 220 may determine a coefficient that identifies a level of similarity of the data object and the predefined element using one of the above stylometry approaches. In this way, scoring platform 220 determines a score of a data object and/or relevance of the data object based on matching style of the data object to style information provided in a predefined element, which allows identification of data objects with similar textual styles as the predefined element.

In some implementations, scoring platform 220 may assign a score for one or more data objects based on a lexical diversity score. A lexical diversity score may identify how many different words are used in a text. Some groups of users, or subject areas, may be associated with a particular lexical diversity trend. For example, a particular group of users may have a tendency to create social media posts with a lexical diversity score that satisfies a threshold. Scoring platform 220 may identify the lexical diversity score of a particular data object to determine whether the particular data object is associated with the particular group of users. Additionally, or alternatively, scoring platform 220 may identify lexical diversity scores of a plurality of data objects associated with a particular user to determine whether the particular user is likely to be associated with the particular group of users. In this way, scoring platform 220 determines a score for a data object based on lexical diversity, which enables inference of relationships between data objects, users, and/or groups based on lexical diversity of text included in the data objects.

In some implementations, scoring platform 220 may assign or adjust a score based on location data associated with a data object. For example, a predefined element may identify a location associated with a group of users, a subject area, and/or the like. Scoring platform 220 may determine whether a location associated with a data object (determined based on the location data) matches or is associated with the location identified by the predefined element. In some implementations, scoring platform 220 may determine a score based on comparing the location identified by the data object and the location identified by the predefined element. For example, scoring platform 220 may assign a higher score when the location identified by the data object is closer to the location identified by the predefined element, and may assign a lower score when the location identified by the data object is farther from the location identified by the predefined element. In this way, scoring platform 220 scores data objects based on proximity of a user associated with the data object to a location identified by a predefined element, which allows inference of whether the user is associated with a group associated with the predefined element.

In some implementations, scoring platform 220 may assign or adjust a score based on an aging factor. For example, scoring platform 220 may adjust a score based on age of a data object. In some implementations, scoring platform 220 may increase a score for a newer data object, and/or may decrease a score as a data object becomes older. Additionally, or alternatively, scoring platform 220 may calculate a score using a decay-based approach, such as an exponential decay approach, a logarithmic decay approach, and/or the like. In this way, scoring platform 220 causes more recent data objects to be assigned higher scores.

In some implementations, scoring platform 220 may assign a score based on one or more users associated with a data object. For example, assume that a data object is associated with a particular user that is associated with a group identified by a predefined element. In such a case, scoring platform 220 may increase a score associated with the data object based on the association between the user and the group. As another example, assume that a data object is created by a user that interacts with a group of users that are associated with scores that satisfy a threshold. In such a case, scoring platform 220 may increase a score of the data object based on the relationship between the data object and the group of users. In this way, scoring platform 220 adjusts scores based on relationships between data objects and users, which permits identification of data objects that are relevant to particular users or groups of users.

In some implementations, scoring platform 220 may assign a score based on a model generated using a machine learning algorithm, such as an artificial intelligence process, a neural network, a genetic algorithm, and/or the like. For example, to train the model, scoring platform 220 may use machine learning to identify a relationship between a set of known inputs (e.g., data objects including known text data, image data, and location data) and a set of known outputs (e.g., scores for the data objects that may be based on a predefined element). Scoring platform 220 may use the model to determine a new output (e.g., scores) for a set of new inputs (e.g., a set of new data objects). In some implementations, scoring platform 220 may update the model (e.g., using machine learning) by comparing the new output (e.g., the scores for the set of new inputs) to observed information regarding the set of new inputs. For example, scoring platform 220 may receive or determine information indicating whether the set of new inputs are, in fact, associated with a particular group or relevant to a particular predefined element, and may adjust the model accordingly. By training and updating a model, scoring platform 220 conserves human resources that would otherwise be used to define such a model and improves accuracy of identification of scores for data objects. Further, scoring platform 220 may identify new values of data objects, not identified by the predefined element, that are relevant to determination of whether a particular data object is associated with a group or subject area, as described in more detail below.

In some implementations, scoring platform 220 may assign a score based on a combination of the above factors and/or other factors not described herein. For example, scoring platform 220 may determine multiple, different scores based on natural language processing, location data, an aging factor, a machine learning algorithm, and/or the like, and may combine the multiple, different scores to determine a score for a particular data object. In some implementations, scoring platform 220 may combine the multiple, different scores based on respective weights of the multiple, different scores. For example, the weights may be determined based on a machine learning approach, a human input, a confidence level associated with one or more of the scores, and/or the like. By combining the multiple, different scores, scoring platform 220 improves accuracy of an output score, and enables multimodal analysis of data objects based on text data, image data, location data, and/or the like.

As further shown in FIG. 4, process 400 may include aggregating the scores, as aggregated scores, with regard to one or more users associated with the relevant data objects (block 440). For example, scoring platform 220 may aggregate scores associated with data objects based on users associated with the data objects. In some implementations, scoring platform 220 may store information identifying a user, and may aggregate information identifying data objects associated with the user and/or aggregated scores of the data objects associated with the user. Based on the aggregated scores, scoring platform 220 may determine information regarding the user, as described in more detail below.

In some implementations, scoring platform 220 may identify a new value to be associated with a predefined element based on aggregating the scores. For example, scoring platform 220 may determine that a particular value (e.g., word, phrase, image, video, user, location, and/or the like) occurs in a set of data objects associated with scores that satisfy a threshold. In some implementations, scoring platform 220 may automatically add the particular value to the predefined element, which permits future identification of relevant objects based on the particular value. In some implementations, scoring platform 220 may provide information identifying the particular value to an administrator of scoring platform 220 for the administrator to determine whether the particular value is relevant to the predefined element, to inform the administrator of the relevance of the particular value, and/or the like. By aggregating scores associated with the data objects and the data received from the data objects, scoring platform 220 enables identification of new values to be added to the predefined element without human intervention, which improves usefulness and reduces cost of implementing the predefined element.

In some implementations, scoring platform 220 may identify particular users based on the aggregated score. For example, scoring platform 220 may identify a user as possibly related to a particular group, movement, predefined element, subject area, and/or the like. In some implementations, scoring platform 220 may identify the user based on the user being associated with an aggregated score (e.g., an average score, a sum of two or more scores, or weighted scores, associated with respective data objects, a highest score, etc.) that satisfies a threshold. Additionally, or alternatively, scoring platform 220 may identify the user based on the user being associated with a quantity of relevant data objects that satisfies a threshold.

In some implementations, scoring platform 220 may identify users that are associated with a user. For example, when scoring platform 220 determines that a user is potentially relevant to a particular group, subject area, predefined element, and/or the like, scoring platform 220 may identify other users that are associated with the user. In some implementations, scoring platform 220 may identify the other users based on interactions with the user and/or data objects of the user (e.g., retweets, mentions, follower/following relationships, etc.). Additionally, or alternatively, scoring platform 220 may identify the other users based on location information associated with the user and the other users. Additionally, or alternatively, scoring platform 220 may identify the other users based on respective aggregated scores associated with the other users. By identifying the other users, scoring platform 220 enables inferences to be made and/or actions to be taken regarding the other users, as described in more detail below. Further, scoring platform 220 may identify the other users automatically based on social media relationships associated with the other users, which reduces human interaction to identify the users and may lead to identification of users that a human would have missed (e.g., based on identifying new values to be added to a predefined element and/or the like).

In this way, scoring platform 220 determines scores for data objects associated with the users (e.g., based on text data, image data, and location data of the data objects), and aggregates the scores over time to determine scores for the users. By determining such scores, scoring platform 220 enables actions to be taken with regard to the data objects and/or the users, as described below.

As further shown in FIG. 4, process 400 may include performing one or more actions based on the aggregated scores associated with the one or more users (block 450). For example, scoring platform 220 may perform an action based on aggregated scores associated with the one or more users, based on information identifying the one or more users, and/or based on information identifying other users that are potentially relevant to the one or more users. In some implementations, scoring platform 220 may provide information identifying the one or more users as potentially associated with a particular group, predefined element, subject area, and/or the like. Additionally, or alternatively, scoring platform 220 may provide information identifying particular data objects that are associated with a user based on an aggregated score associated with a user. Additionally, or alternatively, scoring platform 220 may automatically cause an account associated with a user to be suspended or deleted. Additionally, or alternatively, scoring platform 220 may transmit information to law enforcement officials with jurisdiction in an area identified by location data associated with the one or more users. Additionally, or alternatively, scoring platform 220 may monitor activity of the one or more users and/or the group of users. Additionally, or alternatively, scoring platform 220 may collect additional data objects (e.g., text, video, image, audio, social media posts, etc.) associated with the one or more users, and may store the additional data objects for later analysis. Additionally, or alternatively, scoring platform 220 may automatically populate a form (e.g., a warrant request, etc.). Additionally, or alternatively, scoring platform 220 may automatically generate a graph (e.g., depicting links among individuals and/or roles of individuals, such as leader of a group, member of a group, general of a group, etc.).

In some implementations, scoring platform 220 may add one or more values to the predefined element. For example, scoring platform 220 may automatically add the one or more values. Additionally, or alternatively, scoring platform 220 may provide the one or more values to an administrator, and may add the one or more values to the predefined element based on information, received from the administrator, indicating that the one or more values are to be added to the predefined element. In this way, scoring platform 220 iteratively updates the predefined element to improve utility of the predefined element for detection of data objects or users associated with a particular group, subject area, and/or the like.

In some implementations, scoring platform 220 may use the predefined element, as updated based on data objects associated with first users, to identify data objects associated with second users. For example, scoring platform 220 may use the predefined object for different social networks, different geographical areas, and/or the like. In this way, scoring platform 220 trains a predefined element based on a first set of users, and applies the predefined element for a second set of users, which reduces time, effort, and computational resource consumption required to configure the predefined element for the second set of users.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, scoring platform 220 identifies and scores data objects (e.g., social media posts) that are associated with a particular group or subject area based on a predefined element (e.g., an ontology) identifying values relating to the particular group or subject area. Scoring platform 220 generates the scores based on a multimodal approach of evaluating text data, image data, and location data of the data objects. Further, scoring platform 220 may identify users associated with the data objects, may identify relationships between the users and/or other users based on the data objects and/or connections between the users and/or other users, and may perform actions based on information identifying the scores and/or users. In this way, scoring platform 220 conserves organizational resources that would otherwise be used to identify users and/or data objects, applies a rigorous standardized approach to a process that was previously performed based on human intuition (e.g., identification of data objects and users that are relevant to a predefined element), and iteratively improves the predefined element over time to improve automatic processing of data objects.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Collection of data objects associated with users is described herein. Such collection is performed using publicly available information and/or is performed within the laws of the relevant country.

What is claimed is:

1. A method, comprising:
   receiving, by one or more devices of a cloud computing environment, a plurality of data objects from a plurality of sources;
   identifying, by the one or more devices, text data, image data, and location data of the plurality of data objects;
   filtering, by the one or more devices, the text data, the image data, and the location data, based on a predefined element, to identify relevant data objects,
      the predefined element including information relating to a particular subject area;
   assigning, by the one or more devices, scores to the relevant data objects based on the text data, the image data, and the location data;
   aggregating, by the one or more devices, the scores, as one or more aggregated scores, with regard to one or more users associated with the relevant data objects;
   determining, by the one or more devices and based on aggregating the scores, that a particular value occurs in a set of data objects associated with scores satisfying a threshold;
   associating, by the one or more devices, the particular value with the predefined element based on determining that the particular value occurs in the set of data objects;
   identifying, by the one or more devices, one or more particular users based on the one or more aggregated scores; and
   performing, by the one or more devices, one or more actions based on identifying the one or more particular users,
      the one or more actions including causing one or more accounts, associated with the one or more particular users, to be suspended or deleted.

2. The method of claim 1, where the relevant data objects are first relevant data objects; and
   where the method further comprises:
      identifying second relevant data objects based on associating the particular value to the predefined element.

3. The method of claim 1, where the particular value is associated with the predefined element based on user input regarding the particular value.

4. The method of claim 1, where assigning the scores comprises:
   assigning the scores based on comparing metadata of the relevant data objects to the predefined element.

5. The method of claim 1, where the plurality of data objects are obtained using an application programming interface of a social media platform.

6. The method of claim 1, where each user, of the one or more users, is associated with a respective aggregated score of the one or more aggregated scores.

7. The method of claim 6, where the respective aggregated score for each user is determined based on one or more data objects, of the relevant data objects, that correspond to one or more social media posts by the user.

8. The method of claim 1, wherein the scores are aggregated over a period of time.

9. One or more devices of a scoring platform, comprising:
   one or more processors to:
      receive a plurality of data objects from a plurality of sources;
      identify text data, image data, and location data of the plurality of data objects;
      process the text data, the image data, and the location data, based on a predefined element, to identify relevant data objects,
         the predefined element including information relating to a particular subject area;
      assign scores to the relevant data objects based on the text data, the image data, and the location data;
      aggregate the scores, as one or more aggregated scores, with regard to one or more users associated with the relevant data objects;
      determine, based on aggregating the scores, that a particular value occurs in a set of data objects associated with scores satisfying a threshold;
      associate the particular value with the predefined element based on determining that the particular value occurs in the set of data objects;
      identify one or more particular users based on the one or more aggregated scores; and
      perform one or more actions based on identifying the one or more particular users,
         the one or more actions including causing one or more accounts, associated with the one or more particular users, to be suspended or deleted.

10. The one or more devices of claim 9, where the one or more processors, when identifying the image data, are to:
   identify the image data based on an image captioning procedure.

11. The one or more devices of claim 9, where the predefined element includes an ontology relating to a particular group or the particular subject area.

12. The one or more devices of claim 9, where the one or more processors, when assigning the scores, are to:
   assign the scores based on comparing the text data, the image data, and the location data to the predefined element using natural language processing.

13. The one or more devices of claim 9, where the one or more processors are further to:
   identify the one or more users based on metadata associated with the relevant data objects.

14. The one or more devices of claim 13, where the one or more processors are further to:
   identify other users associated with the one or more users based on interactions between the other users and the one or more users; and
   where the one or more processors, when assigning the scores, are to:
      assign the scores based on the relevant data objects being associated with at least one of the one or more users or the other users.

15. The one or more devices of claim 14, where at least one of the one or more users or the other users are identified by the predefined element.

16. A non-transitory computer-readable medium storing instructions, the instructions comprising:
   one or more instructions that, when executed by one or more processors, cause the one or more processors to:
      identify text data, image data, and location data of a plurality of data objects associated with a plurality of social media posts and associated with a plurality of sources;
      process at least one of the text data, the image data, or the location data, based on a predefined element, to identify relevant data objects,
         the predefined element including information relating to a particular subject area;
      assign scores to the relevant data objects based on the text data, the image data, and the location data;
      aggregate the scores, as an aggregated score, with regard to a user associated with the relevant data objects;
      determine, based on aggregating the scores, that a particular value occurs in a set of data objects associated with scores satisfying a threshold;
      associate the particular value with the predefined element based on determining that the particular value occurs in the set of data objects;
      identify a particular user based on the aggregated score; and
      perform one or more actions based on identifying the particular user,
         the one or more actions including causing an account, associated with the particular user, to be suspended or deleted.

17. The non-transitory computer-readable medium of claim 16, where the one or more instructions, that cause the one or more processors to assign the scores, cause the one or more processors to:
   assign the scores based on an aging factor,
      where newer data objects are assigned a different score than older data objects based on the aging factor.

18. The non-transitory computer-readable medium of claim 16, where the one or more instructions, that cause the one or more processors to identify the image data, cause the one or more processors to:
   identify the image data based on an image captioning process,
      the image data including a textual description of one or more aspects of an image associated with a particular data object of the plurality of data objects.

19. The non-transitory computer-readable medium of claim 16, where the one or more instructions, that cause the one or more processors to identify the location data, cause the one or more processors to:
   identify the location data based on recognizing one or more aspects of an image associated with a particular data object of the plurality of data objects.

20. The non-transitory computer-readable medium of claim 16, where the one or more instructions, when executed by the one or more processors, further cause the one or more processors to:
   identify other users associated with the user based on social media interactions of the other users and the user; and
   where the one or more instructions, that cause the one or more processors to perform the none or more actions, cause the one or more processors to:
      perform the one or more actions with regard to the user and the other users.

* * * * *